United States Patent
Koo et al.

(10) Patent No.: US 10,706,812 B2
(45) Date of Patent: Jul. 7, 2020

(54) SOURCE-SIDE TONE MAPPING BASED ON NATIVE COLOR GAMUT AND BRIGHTNESS OF DISPLAY

(71) Applicant: ATI TECHNOLOGIES ULC, Markham (CA)

(72) Inventors: Anthony W L Koo, Markham (CA); Syed Athar Hussain, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 15/993,393

(22) Filed: May 30, 2018

(65) Prior Publication Data
US 2019/0371262 A1 Dec. 5, 2019

(51) Int. Cl.
| | |
|---|---|
| G09G 5/00 | (2006.01) |
| G09G 3/20 | (2006.01) |
| G09G 5/36 | (2006.01) |
| H04N 1/60 | (2006.01) |
| H04N 5/57 | (2006.01) |
| H04N 9/64 | (2006.01) |
| G09G 5/10 | (2006.01) |

(52) U.S. Cl.
CPC .......... *G09G 5/005* (2013.01); *G09G 3/2003* (2013.01); *G09G 3/2007* (2013.01); *G09G 3/2096* (2013.01); *G09G 5/10* (2013.01); *G09G 5/363* (2013.01); G09G 2320/0666 (2013.01); G09G 2340/06 (2013.01); G09G 2370/042 (2013.01)

(58) Field of Classification Search
CPC combination set(s) only.
See application file for complete search history.

(56) References Cited

U.S. PATENT DOCUMENTS

| | | | |
|---|---|---|---|
| 9,501,963 B2 | 11/2016 | Myers | |
| 2015/0277840 A1* | 10/2015 | Ninan | G06F 3/1423 345/589 |
| 2015/0310791 A1* | 10/2015 | Croxford | G09G 5/10 345/589 |
| 2016/0261860 A1 | 9/2016 | Gu et al. | |

(Continued)

OTHER PUBLICATIONS

Website: https://www.samsung.com/us/computing/monitors/gaming/27--chg70-gaming-monitor-with-quantum-dot-lc27hg70qqnxza/, accessed May 30, 2018, 19 pages.

(Continued)

*Primary Examiner* — Wesner Sajous

(57) ABSTRACT

A display system includes a rendering device configured to couple to a display monitor. The rendering device includes a graphics processing unit (GPU) configured to render display images for a video stream to be displayed at the display monitor. The rendering device further includes a central processing unit (CPU) configured to obtain display parameters for the display monitor, the display parameters including data identifying a native color gamut, a native luminance range of the display monitor, and one or more backlighting characteristics of the display monitor, and to configure the GPU to render a display image of the video stream that is tone mapped to the native color gamut and the native luminance range and based on the one or more backlighting characteristics. The display monitor is configured to provide the display image for display without tone re-mapping the display image.

18 Claims, 4 Drawing Sheets

(56) References Cited

U.S. PATENT DOCUMENTS

2017/0025074 A1* 1/2017 Farrell .............. G06K 9/00711
2017/0220496 A1 8/2017 Colenbrander

OTHER PUBLICATIONS

Website: https://gaming.radeon.com/en/freesync2ppsg/?sessionGUID=74cbc630-576c-a561-0790-b21b412c219e&sessionGUID=b8c99304-6877-b126-8a64-7b8cee6a29ad&webSyncID=ce524b32-d690-d912-85d7-085395ba20c8&sessionGUID=ccdc4d0a-0467-8aaa-635a-710d2e4d2dc5, accessed May 30, 2018, 10 pages.

Website: https://www.anandtech.com/show/10967/amd-announces-freesync-2-improving-ease-lowering-latency-of-hdr-gaming, accessed May 30, 2018, 8 pages.

International Search Report and Written Opinion dated Jul. 9, 2019 for International Application No. PCT/IB2019/052613, 10 pages.

Smith, Ryan, AMD Announces FreeSync 2: Easier & Lower Latency HDR Gaming, Jan. 3, 2017, <https://www.anandtech.com/show/10967/amd-announces-freesync-2-improving-ease-lowering-latency-of-hdr-gaming>, accessed Jul. 23, 2019, 8 pages.

Borg, Lars, SMPTE ST 2094 and Dynamic Metadata, Feb. 2, 2017, <https://www.smpte.org/sites/default/files/2017-01-12-ST-2094-Borg-V2-Handout.pdf>, Accessed Jul. 22, 2019, 15 pages.

Shrout, Ryan, AMD Freesync 2 Brings Latency, LFC and Color Space Requirements, <https://pcper.com/2017/01/amd-freesync-2-brings-latency-lfc-and-color-space-requirements/>, Accessed Jul. 23, 2019, 11 pages.

AMD, Radeon FreeSync™ 2 Technology Brings High Dynamic Range Gaming to Advanced PC Displays, Jan. 3, 2017, <https://www.amd.com/en/press-releases/freesync-2-2017jan04>, Accessed Jul. 23, 2019, 3 pages.

* cited by examiner

US 10,706,812 B2

SOURCE-SIDE TONE MAPPING BASED ON NATIVE COLOR GAMUT AND BRIGHTNESS OF DISPLAY

BACKGROUND

Conventional display standards provide for the rendering of display images in accordance with a specified generic color gamut and luminance ranges. However, many display monitors have color gamut ranges or luminance ranges that are smaller, or in some instances, larger, than the ranges utilized during rendering. Accordingly, in a conventional display system, the rendering device typically renders display images in accordance with the default color gamut and luminance ranges and transmits the resulting data stream to the display monitor. The display monitor, in turn, then performs a separate tone mapping process to remap the rendered display data to a gamut and luminance range that can be displayed by the display monitor. This secondary tone mapping process at the display monitor can introduce a considerable delay, which is particularly problematic for gaming applications that rely on low render-to-display latencies to provide an enjoyable user experience. Moreover, the secondary tone mapping may alter the resulting display content in a manner inconsistent with the intent of the content creator.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Conventional display systems assume a default color gamut range and a default luminance range when rendering display images of a video stream, and thus force a display monitor receiving the video stream to perform post-processing on each received display image to re-map the received display image to the actual color gamut and luminance ranges implemented by the display monitor (hereinafter, the "native" gamut and luminance ranges). The processing power of display monitor is relatively limited compared to the rendering device providing the video stream, particularly when the graphics processing unit (GPU) of the rendering device has a dedicated pipeline, and thus this second tone mapping process performed by the display monitor often introduces considerable latency in the render-to-display pipeline. Moreover, this re-mapping process often can result in changes to the resulting display image that are inconsistent with the original intent of the content creator for the video stream. Further, as the GPU typically has higher processing capabilities than the display monitor, the image natively prepared by the GPU typically has better quality than a post-processed image produced by the display monitor.

In contrast, systems and techniques described herein employ the graphics processing unit (GPU) of the rendering device to render the display images so that they are tone mapped to the native gamut and luminance ranges of the display monitor and in view of the particular backlight characteristics of the display monitor before being transmitted to the display monitor. This allows the display monitor to bypass tone re-map post processing, and thus provide the display images for display earlier after receipt at the display monitor. Moreover, by originally rendering the display images in accordance with the native gamut and luminance ranges and the backlighting characteristics of the display monitor and thus eliminating the need for a second tone mapping process, less tone mapping error is introduced into the display images that are ultimately displayed, and thus the displayed imagery may more accurately represent the content creator's intent.

Figure 1:
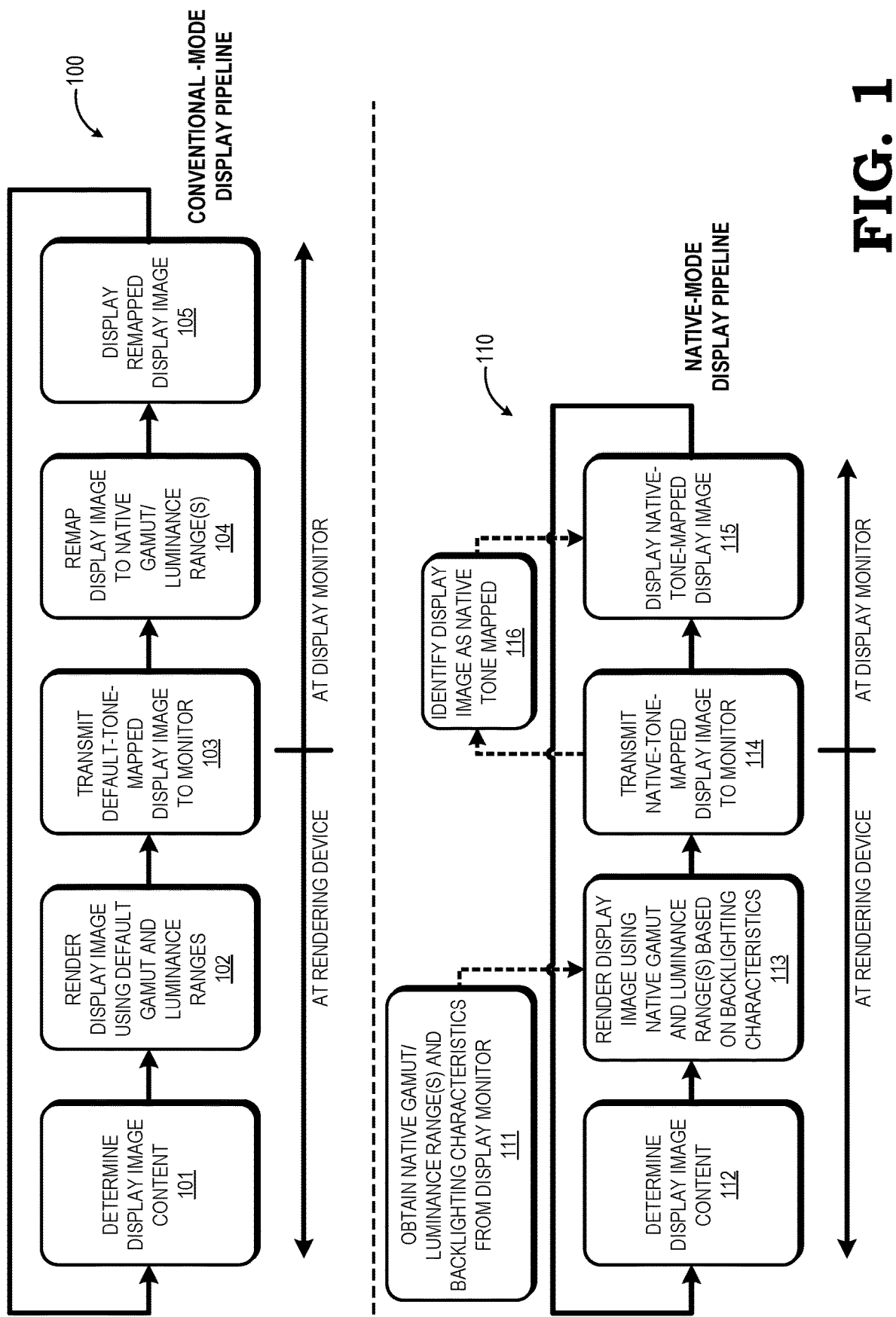
FIG. 1 is a diagram illustrating a display native mode rendering process compared to a conventional default mode rendering process in accordance with some embodiments.

FIG. 1 illustrates the conventional default-tone-mapping approach compared to a native-tone-mapping approach in accordance with some embodiments. The conventional approach is represented by a conventional-mode display pipeline 100. In the conventional-mode display pipeline 100, a display monitor identifies itself to a rendering device as being compliant with a display specification, such as the High Dynamic Range 10 (HDR.10) specification, a Dolby Vision specification, and the like, and the rendering device configures the conventional-mode display pipeline 100 according to the identified display specification of the display monitor and initiates video stream generation and transmission using the conventional mode display pipeline 100. As will be appreciated, video stream is composed of data representing a stream of display images, and associated metadata. To generate a display image, at stage 101 a software application serving as the source of the video stream determines the visual content to be presented in the display image and a graphics driver, display driver, or other software interface configures the GPU of the rendering device to render the display image accordingly at stage 102.

The display specification identified by the display monitor typically employs a default color gamut and one or more illuminance range(s). To illustrate, the HDR.10 specification implements the CEA 861.3 HDR Static Metadata specification or BT.2020 specification, which provides for a wide color gamut (WCG) and a global luminance range of 0 to 10,000 nits. Thus, part of the rendering process of stage 102, in the conventional-mode display pipeline the GPU of the rendering device is configured to perform an initial tone mapping for the resulting display image such that the pixel values of the display image are mapped to corresponding codewords that comply with the default color gamut and default luminance range(s) of the display specification. Thus, if the display monitor is implementing the HDR.10 display specification, the codewords representing the rendered display image would be mapped to the default wide color gamut and to the default luminance range between 0 and 10,000 nits. At stage 103, the display image tone-mapped to the default color gamut/illuminance ranges is encoded and transmitted to the display monitor using a wired or wireless interconnect and corresponding transport protocol, such as a DisplayPort specification, a High-Definition Multimedia Interface (HDMI) specification, and the like.

After receiving the display image, the display monitor prepares the display image for display. However, while the display monitor may support the identified display specification for which the display image was rendered and encoded, the display monitor typically is unable to fully or correctly display the default color gamut and luminance ranges of the display specification. To illustrate again using HDR.10, while this specification specifies a default wide color gamut and luminance range of 0 to 10,000 nits, the display monitor may only be capable of supporting a color gamut larger than the sRGB color space but smaller than the color space defined by the ITU-R BT.2020 specification, and a luminance range of only 0 to 400 nits. Accordingly, to prepare the display image for display, at stage 104 of the conventional-mode display pipeline 100, the display monitor uses its relatively-limited processing capability to post-process the received display image to tone re-map the display image to the color gamut (e.g., larger than sRGB), smaller than BT.2020) and illuminance range (e.g., 0-400 nits) natively supported by the display monitor, with this process often taking tens of milliseconds (ms) or more. After the display image has been re-mapped to comply with the native color gamut/luminance range of the display monitor, at stage 105 the display monitor proceeds with providing the remapped display image for display.

Turning now to the native-tone-mapping approach represented by a native-mode display pipeline 110, in addition to identifying the display specification to which the display monitor purports to comply, at an initialization stage 111 the rendering device determines the native color gamut and luminance range(s) actually supported by the display monitor, as well as the backlight parameters of the display monitor, such as whether local dimming or global backlight control is supported, as well as luminance ranges under corresponding backlight modes or levels. As described in greater detail herein, this information may be supplied by the display monitor as part of the Display Identification Data (DID) or Extended DID (EDID) supplied by the display monitor during initialization. The rendering device then may initiate a video streaming process to supply a stream of display images to the display monitor for display, along with corresponding metadata.

As with the conventional-mode display pipeline 100, a source application at the rendering device determines the image content to be represented in a display image to be rendered at stage 112. However, unlike the conventional-mode display pipeline 100 in which the display image is rendered by the GPU in accordance with a default color gamut and a default luminance range, at stage 113 of the native-mode display pipeline 110, the rendering device configures its GPU to render the display image such that the resulting display image is tone mapped to the native color gamut and native luminance range(s) provided by the display monitor. That is, rather than tone mapping the display image to default color gamut and luminance range, the native-mode display pipeline tone maps the display image to the specific color range and luminance range(s) that the display monitor can actually support; that is, the native color gamut and native luminance range(s) of the display monitor. As such, after the rendered display image is transmitted to the display monitor (stage 114), rather than having to tone re-map the display image into a color space and luminance level the display monitor can support (stage 104 of the conventional-mode display pipeline 100), in the native-mode display pipeline 110 the display monitor can proceed directly to providing the native-mapped display image for display at stage 115.

Further, backlighting plays a role in the display of native color gamut and luminance at the display monitor, and thus in some embodiments, the rendering device configures the GPU to render the display image further based on the backlight parameters supplied by the display monitor. To illustrate, the backlight parameters include, for example, an indication of whether the display monitor supports either local dimming control by the source (i.e., where the backlighting of different regions or zones of the display panel of the display monitor is separately controllable by the source device) or global backlighting control (i.e., where the backlighting is controlled for the entire display panel as a whole is controllable by the source device (that is, the GPU driver or hardware)). For a global backlighting mode, in some embodiments the backlight parameters supplied by the display monitor include one or more ranges. To illustrate, backlight parameters may indicate the luminance emitted by the display monitor on a full white screen at minimum backlighting and at maximum backlighting, as well as parameters that indicate the luminance emitted by the display monitor for a full black screen at minimum backlighting and maximum backlighting. In some embodiments, the backlight parameters for the local dimming mode are indicated by similar luminance ranges.

The luminance ranges or values provided as part of the backlighting parameters of the display monitor allow the GPU or rendering application of the rendering device to understand the characteristics of the display luminance in relation to the backlighting settings, and thus allows the GPU or rendering application to render display content of the display images so that it is correctly represented at the display monitor. To illustrate, the display monitor may be unable to achieve a certain luminance level unless backlighting is set to a very low level or a very high level. Control of the native rendering process in view of such backlighting characteristics allows the content creator, through configuration of the rendering application or the GPU, to represent a dark image by adjusting the display backlight dynamically in view of the indicated display luminance given a corresponding backlight setting, or to represent a bright pixel by dynamically setting the backlight to a high level. The backlighting characteristics may be represented by the backlight parameters in any of a variety of ways. In some implementations, a relatively simple min/max backlight mapping may be provided in the form of a represented linear mapping or a default relatively simple curve representation. Alternatively, the backlighting characteristics may be represented by a more detailed curve that described display luminance at each backlight level.

As described below, in some embodiments the rendering device and display monitor may switch between the conventional default tone-mapping mode represented by conventional-mode display pipeline 100 and the native tone-mapping mode represented by native-mode display pipeline 110 on a per-image basis. Accordingly, in such implementations, at stage 116 (which occurs concurrent with stage 114) the rendering device signals to the display monitor whether the transmitted display image is default tone mapped or native tone mapped. To illustrate, both the HDMI and DisplayPort specifications provide for the transmission of metadata for each "frame" (that is, display image) in the form of an InfoFrame associated with the frame, and an indicator of the tone mapping mode and per-frame synchronous backlight control mode for the corresponding display image thus is included in the corresponding InfoFrame.

Comparing the conventional-mode display pipeline 100 to the native-mode display pipeline 100, it will be appreciated that the native-mode display pipeline 110 implements only a single tone-mapping process, at stage 113, and avoids the second tone mapping process required by stage 104 of the conventional-mode display pipeline 100. As only the first tone mapping process is performed in the native-mode display pipeline 110, the render-to-display latency of the native-mode display pipeline 110 is reduced by, for example, tens of milliseconds or more, compared to the conventional-mode display pipeline. Moreover, by requiring only the initial tone mapping process, the resulting display image may be rendered to more closely adhere to the intent of the content creator, and thus provide for a more accurate viewing experience for the user.

Figure 2:
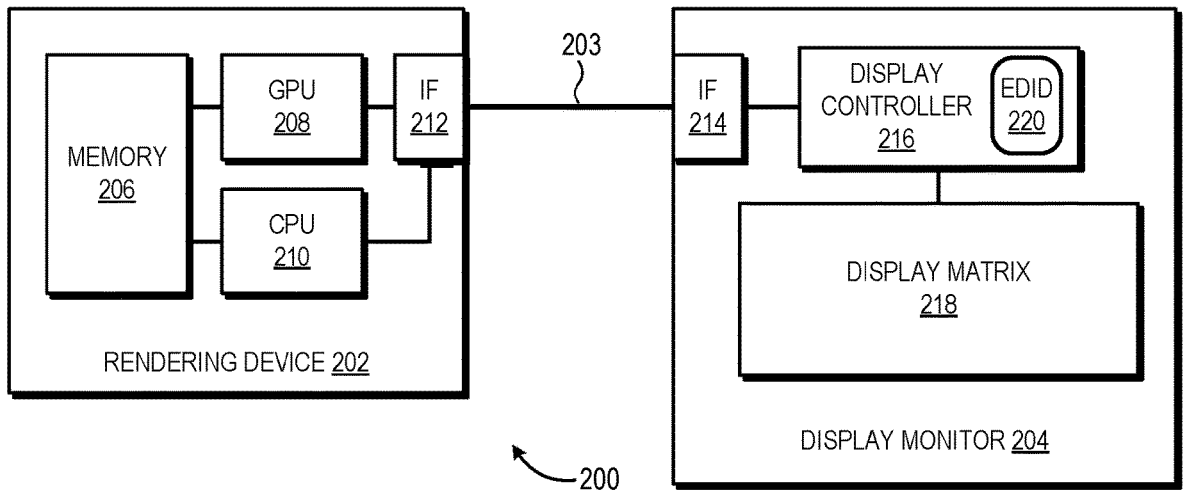
FIG. 2 is a block diagram illustrating a display system implementing a native display mode for rendering display images of a video stream in accordance with some embodiments.

FIG. 2 illustrates a display system 200 implementing the native-mode display pipeline 110 of FIG. 1 in accordance with some embodiments. The display system 200 includes a rendering device 202 and a display monitor 204 connected by a wired or wireless interconnect 203. The rendering device 202 includes any of a variety of devices used to generate video content, including a notebook computer, a desktop computer, a server, a game console, a compute-enabled smart-phone, and the like. The display monitor 204 comprises a digital display device to display video content, such as a digital television, computer monitor, portable device display, and the like. The rendering device 202 includes at least one memory 206, at least one processor, such as a GPU 208 and a central processing unit (CPU) 210, and a display interface (IF) 212. The display monitor 204 includes a display interface 214, a display controller 216, and a display matrix 218. The display interfaces 212, 214 comprise wired or wireless interconnect interfaces, such as HDMI interfaces, DisplayPort interfaces, embedded DisplayPort (eDP) interfaces, and the like. The display controller 216 is implemented as one or more processors configured to execute software instructions stored in memory (not shown), one or more programmable logic components, one or more hardcoded logic components, or a combination thereof. The display matrix 218 includes a two-dimensional array of pixels used to display a sequence of display images, and comprises, for example, a light emitting diode (LED) matrix, an organic LED (OLED) matrix, a liquid crystal display (LCD) matrix, or the like.

As a general operational overview, the memory 206 stores one or more sets of executable software instructions configured to manipulate the CPU 210 and GPU 208 to render a video stream comprising a series of display images and corresponding metadata and to transmit this video stream to the display monitor 204 via the display interfaces 212, 214 and the interconnect 203. At the display monitor, the display controller 216 receives each display image and corresponding metadata in turn, and processes the display image for display in sequence at the display matrix 218. In at least one embodiment, the rendering device 202 and the display monitor 204 are configurable to implement the native-mode display pipeline 110 of FIG. 1 such that an EDID module 220 of the display controller 216 provides an EDID or other configuration information packet to the rendering device 202 that specifies the native color gamut and one or more luminance ranges supported by the display monitor 204, as well as backlighting parameters indicating backlighting mode capabilities (e.g., local dimming control by the source or. global backlighting control by the source), and parameters representative of luminance ranges under various backlighting conditions or levels. The rendering device 202 controls the GPU 208 so as to render one or more of the display images of the video stream with tone mapping consistent with the indicated native color gamut and native luminance range(s) and the indicated backlighting characteristics; that is, with native tone mapping. This process is described in greater detail below.

Figure 3:
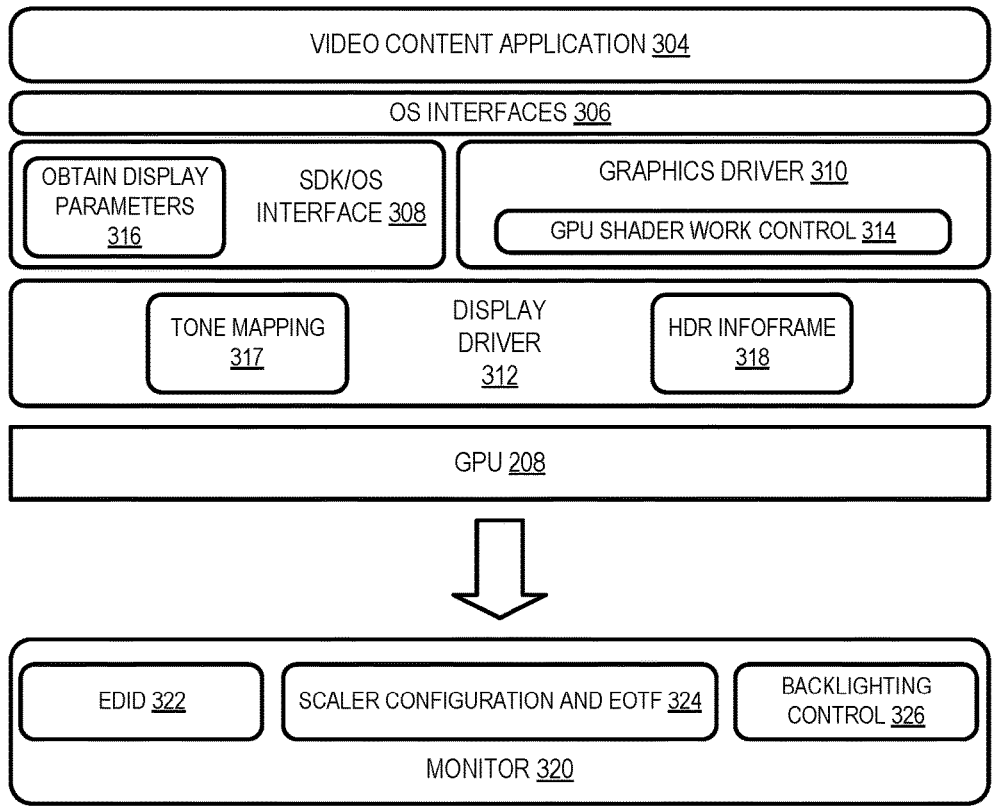
FIG. 3 is a diagram illustrating a software stack implemented by the display system of FIG. 2 in accordance with some embodiments.

FIG. 3 illustrates the software stacks implemented at the rendering device 202 and the display monitor 204 to facilitate implementation of the native-mode display pipeline 110 in accordance with some embodiments. Software stack 302 is implemented in the rendering device 202, and includes one or more video content applications 304, one or more operating system (OS) interfaces 306, a software developer kit (SDK)/OS interface 308, a graphics driver 310, and a display driver 312. The video content application 304 includes a software application that sources the video content to be rendered, such as a gaming application, a virtual reality (VR) or augmented reality (AR) application, a video playback application, and the like. Drawing instructions for a display image of this video content are provided to the graphics driver 310 via an OS interface 306, whereupon a GPU shader work control function 314 controls shaders of the GPU 208 to render the corresponding display image. The SDK/OS interface 308 includes an obtain display parameters function 316 that analysis the EDID, DID, or other configuration information packet provided by the display monitor 204 to determine various parameters of the display monitor 204, including its native gamut and native luminance range(s).

The display driver 312 includes a tone mapping function 317 to configure the GPU 208 so that the shader operations performed by the GPU 208 for rendering a display image are tone mapped to a specified color gamut and luminance range, which may be a default gamut and default luminance range as set by a display specification, or the native gamut and native luminance ranges, depending on the rendering mode. Further, in some embodiments, the tone mapping function 317 further configures the GPU 208 such that the shader operations reflect the backlighting characteristics of the display monitor. The display driver 312 further includes an HDR InfoFrame function 318 used to facilitate the generation and transmission of an InfoFrame for each generated display image.

Software stack 320 represents the software stack implemented at the display monitor 204 and includes an EDID function 322 (one implementation of the EDID module 220, FIG. 2) to generate EDID for the rendering device 202 during initialization. The software stack 320, in some embodiments, further includes a scalar configuration and electro-optical transfer function (EOTF) interface 324 for post-processing of display images that are not compatible with the display parameters supported by the display monitor 204, as well as a backlight control interface 326 for configuring the backlighting of the display monitor 204 during display of the received display images in coordination with the SDK/OS interface 308.

Figure 4:
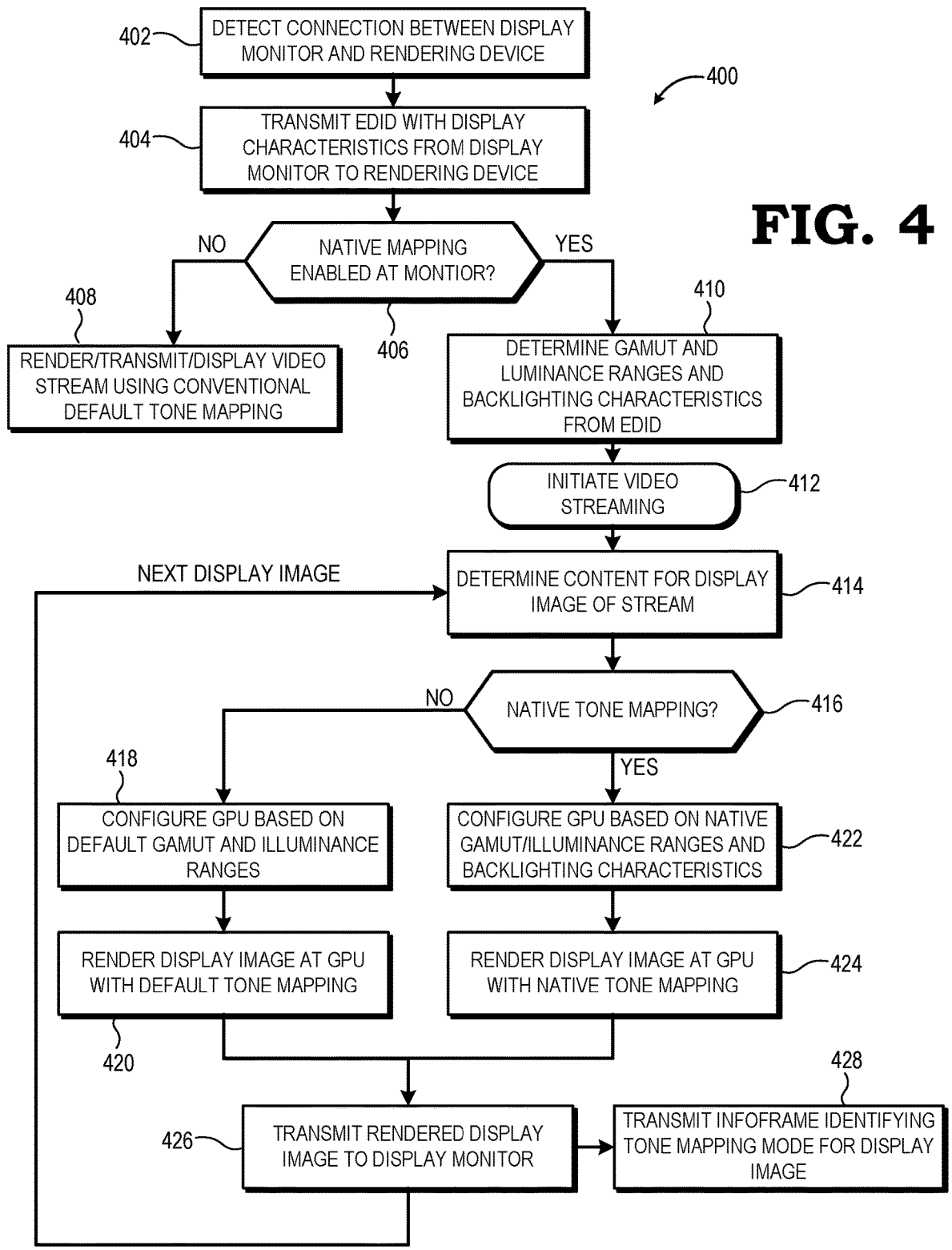
FIG. 4 is a diagram illustrating a method for rendering display images of a video stream at a rendering device using either of a default tone mapping mode or a native tone mapping mode in accordance with some embodiments.
Figure 5:
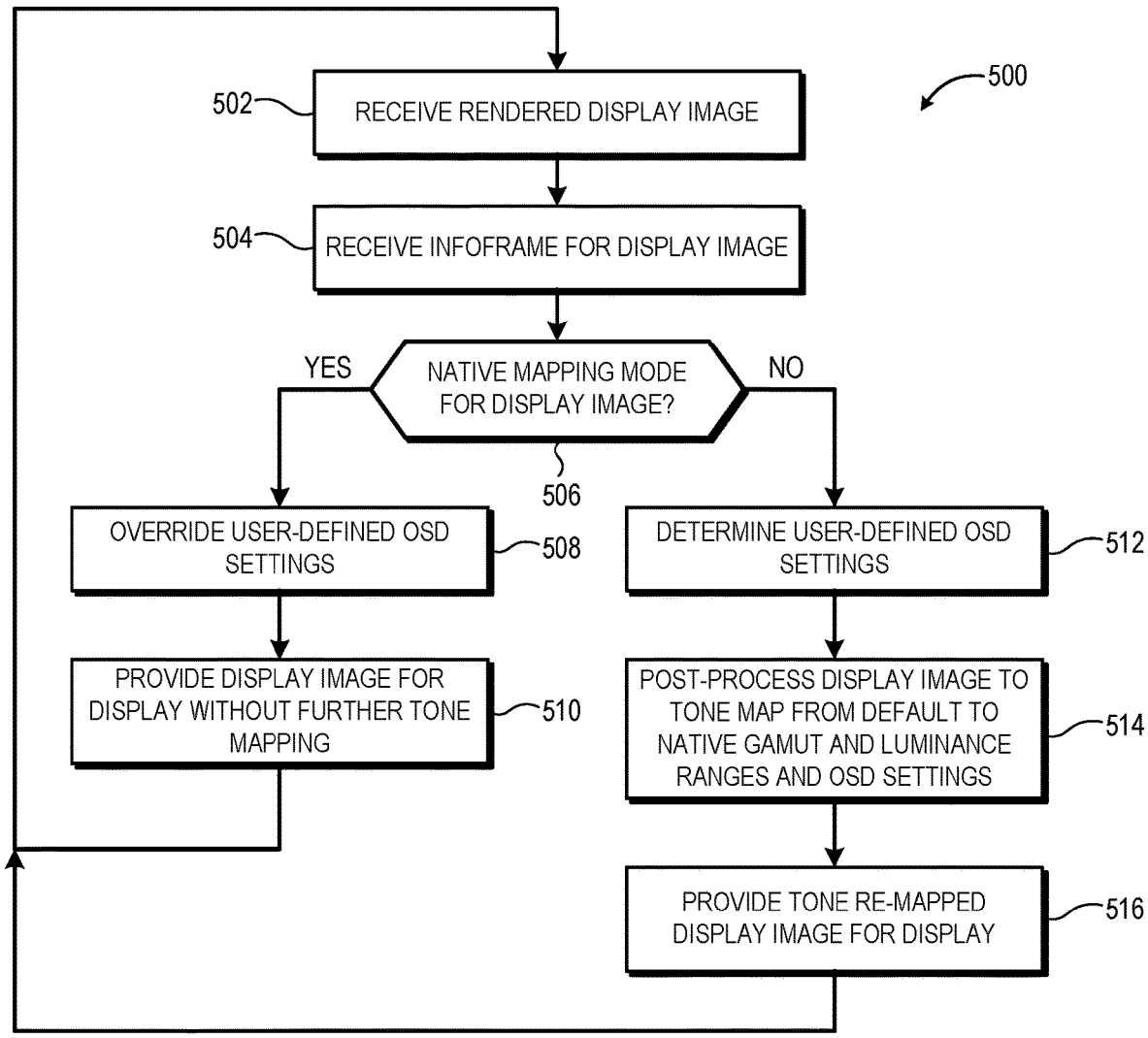
FIG. 5 is a diagram illustrating a method for receiving and displaying display images of a video stream at a display monitor based on a tone mapping mode of each display image in accordance with some embodiments.

FIGS. 4 and 5 together illustrate the operation of the rendering device 202 and its software stack 302 (FIG. 4) and the display monitor 204 and its software stack 320 (FIG. 5) for generation, transmission, and display of a video stream comprising a sequence of display images tone mapped to either a default gamut and luminance range of a display specification or tone mapped to a native gamut, luminance range, and backlighting characteristics of the particular display monitor 204 coupled to the rendering device 202.

Turning to FIG. 4, a video stream rendering method 400 is illustrated in accordance with some embodiments. The method 400 initiates at block 402 with the rendering device 202 and the display monitor 204 detecting each other via the interconnect 203. In response to this detection, the rendering device 202 and display monitor 204 commence paired initialization. As part of this initialization process, at block 404 the display monitor 204 transmits data representative of its display parameters to the rendering device 202. In one embodiment, this data is generated and provided by the EDID module 220 of FIG. 2)(implemented as, for example, EDID function 322 of FIG. 3) of the display monitor 204 to the obtain display parameters function 316 of the rendering device 202 as an EDID via an I2C bus or other side channel, as is known in the art. In other embodiments, this display configuration data is transmitted as, for example a DisplayID (DID) or in a proprietary format.

A conventional EDID includes various parameters of the display monitor providing the EDID, including version, manufacturer, screen size, gamma setting, timings, refresh rate, and the like. In at least one embodiment, the EDID module 220 expands upon a conventional EDID by including chromaticity and luminance parameters for the display monitor 204, with these parameters defining the native color gamut and native luminance range(s) of the display monitor 204, as well as including backlight parameters for the display monitor 204, with the backlight parameters specifying one or more of backlighting modes supported by the display monitor 204, luminance values or ranges under different backlighting conditions or levels, and the like. To illustrate, Version 3 of the EIA/CEA-861 specification for EDID provides for certain extension blocks, including use of a vendor specific data block (VSDB) which is vendor-defined. As such, in some embodiments, the EDID module 220 inserts a VSDB into the EDID to be provided to the rendering device, wherein this VSDB provides accurate reporting of the native chromaticity and luminance values, such as by identifying one or more of: whether the display monitor 204 supports the native tone-mapping mode, the chromaticity parameters of the display monitor 204, one or more luminance ranges of the display monitor, such as minimum and maximum static panel brightness levels at maximum backlighting, minimum and maximum static panel brightness levels at minimum backlighting, and the like. For example, Table 1 illustrates e example VSDB format used to provide native luminance capabilities in an EDID in accordance with one embodiment (native gamut capabilities are supplied in the EDID) and Table 2 illustrates another example VSDB format (with parameters pertaining to native tone mapping mode emphasized with bold font):

TABLE 1

First VSDB example with native mode parameters for inclusion in EDID

| Byte | Description | Value |
|---|---|---|
| IEEE OUI | ABC Co. IEEE OUT value | 0x0000XX |
| Byte 0 | Version | 0x0X |
| Byte 1 | Expanded Capabilities Capability | |
| | Bit 0 = <Omitted for Clarity> | <Omitted for Clarity> |
| | Bit 1 = Native Tone Mapping Mode Supported | Bit 1 = 1; Native Tone Mapping Mode Supported |
| | Bit 2 = "Seamless Global Backlight Control" Supported | Bit 2 = 1; Seamless Global Backlight Control from Source Supported |
| | Bit 3 = "Seamless Local Dimming Control" Supported* | Bit 3 = 1; Seamless Local Dimming Control from Source Supported |
| | Bit 4:7 = Reserved | Bit 4:7 = 0 |
| Byte 2 | <Omitted for Clarity> | <Omitted for Clarity> |
| Byte 3 | <Omitted for Clarity> | <Omitted for Clarity> |
| Byte 4 | <Omitted for Clarity> | <Omitted for Clarity> |
| Byte 5 | Supported WCG and HDR features | |
| | Bit 0 = sRGB | Bit 0 = 1; Supports seamless sRGB transfer curve switching |
| | Bit 1 = BT.709 | Bit 1 = 1; Supports seamlessBT.709 transfer curve switching |
| | Bit 2 = Gamma 2.2 | Bit 2 = 1; Supports seamless Gamma 2.2 transfer curve switching |
| | Bit 3 = Gamma 2.6 | Bit 3 = 1; Supports seamless Gamma 2.6 transfer curve switching |
| | Bit 4 = PQ | Bit 4 = 1; Supports Perceptual Quantizer Curve as EOTF |
| | Bit 5:7 = Reserved (0) | Bit 5:7 = Reserved (0) |
| Byte 6 | Max Luminance 1 Max Luminance 1 Value [In units of 1 Cd/m2] = $50 \times 2^{(CV/32)}$ e.g. Min value is $50 \times 2^{(0/32)} = 50.00$ Cd/m2 e.g. Max value is $50 \times 2^{(255/32)} = 12525.72$ Cd/m2 | Max static panel brightness at max backlight level; or if Local Dimming Control supported, peak luminance |

TABLE 1-continued

First VSDB example with native mode parameters for inclusion in EDID

| Byte | Description | Value |
|---|---|---|
| Byte 7 | Min Luminance 1<br>Min Luminance 1 Value [In units of 1 Cd/m2] = (Max Luminance 1) × $(CV/255)^2/100$<br>e.g. Min value is $50 \times (0/255)^2/100 = 0.00$ Cd/m2<br>e.g. Max value is $12525.72 \times (255/255)^2/100 = 125.26$ Cd/m2 | Min static panel brightness at max backlight level; or if Local Dimming Control supported, equal to Min Luminance with local dimming enabled |
| Byte 8 | Max Luminance 2<br>Max Luminance 2 Value [In units of 1 Cd/m2] = $50 \times 2^{(CV/32)}$ | Max static panel brightness at min backlight level; or if Local Dimming Control supported, average luminance |
| Byte 9 | Min Luminance 2<br>Min Luminance 2 Value [In units of 1 Cd/m2] = (Max Luminance 2) × $(CV/255)^2/100$ | Min static panel brightness at min backlight level; or if Local Dimming Control supported, equal to Min Luminance corresponding with local dimming control disabled |

*Supporting Seamless Local Dimming Control requires the display monitor to toggle Local Dimming enable/disable based on the value transmitted by the rendering device. If Seamless Local Dimming Control is supported by the display monitor, then the following is suggested: Max Luminance 1 field should be populated with peak luminance value based on a 10% white patch; Max Luminance 2 field should be populated with average luminance value based on 100% full white pattern; Min Luminance 1 field should be populated with min luminance value based on 100% black pattern; and Min Luminance 2 field should be populated with min luminance value based on black image with white patch in the corners.

TABLE 2

Second VSDB example with native mode parameters for inclusion in EDID (with parameters pertaining to native tone mapping mode emphasized with bold font):

| Data Byte # | EDID VALUE | Definition |
|---|---|---|
| IEEE OUI | 0x0000XX | ABC Co. IEEE OUI value |
| Byte 0 | 0x0X | Version = X |
| Byte 1 | Code Value = 3 | Variable Rate Support = true<br>Native Tone Mapping Support = true<br>Backlight Control Support = false |
| Byte 2 | Code Value = 40 | Min Refresh Rate in Hz = 40 Hz |
| Byte 3 | Code Value = 144 | Max Refresh Rate in Hz = 144 Hz |
| Byte 4 | Code Value = 0 | VCP Code |
| Byte 5 | Code Value = 4 | Supports seamless Gamma 2.2 transfer curve switching |
| Byte 6 | Code Value = 100 | Max Luminance 1 = 436.20 cd/m2 |
| Byte 7 | Code Value = 50 | Min Luminance 1 = 0.1677 cd/m2 |
| Byte 8 | Code Value = 20 | Max Luminance 2 = 77.11 cd/m2 |
| Byte 9 | Code Value = 40 | Min Luminance 2 = 0.0190 cd/m2 |

Table 3 illustrates an example EDID that incorporates a VSDB as [Data Block 4] in accordance with the example of Table 2 (with parameters pertaining to native tone mapping mode emphasized with bold font):

TABLE 3

Example EDID with Native Tone Mapping VSDB:

[EDID BASE BLOCK]
[General Info]
Version...: X
Manufacturer Name...: ABC Co.
Product Code...: 0x1234
Serial Number...: 0x1234
Date of Manufacture.: 2017, week 35
Number of extensions: 1
Checksum...: 0x25
[Basic Display Parameters]
Interface...: Digital
Display Color Type...: RGB color display
Screen size (cm)...: 60×34
Gamma...: 2.20
Standby...: Not Supported
Suspend...: Not Supported
Active Off/Very Low Power...: Not Supported
Default color space...: sRGB
x Preferred timing mode is indicated in the first detailed timing block
x No default GTF support TABLE 3-continued Example EDID with Native Tone Mapping VSDB:

[Display Native Color Characteristics]
Red Chromaticity..: X = 0.700, Y = 0.285
Green Chromaticity: X = 0.268, Y = 0.675
Blue Chromaticity.: X = 0.149, Y = 0.052
White Point...: X = 0.313, Y = 0.328
Area of sRGB: 140.82%
Area of AdobeRGB: 104.39%
Area of DCI-P3: 103.81%
Area of BT2020: 74.48%
[Established Timings I & II]
  <omitted for brevity>
[Standard Timings]
  <omitted for brevity>
[Descriptor 0: Detailed Timing]
  <omitted for brevity>
[Descriptor 1: Dummy]
[Descriptor 2: Display Range Limits]
  <omitted for brevity>
[Descriptor 3: Display Product Name]
  <omitted for brevity>
[EDID CEA EXTENSION BLOCK]
  [General Info]
    <omitted for brevity>
  [Detailed Timing 0]
    <omitted for brevity>
  [Detailed Timing 1]
    <omitted for brevity>
  [Datablock 0: Video Data Block]
    <omitted for brevity>
  [Datablock 1: Audio Data Block]
    <omitted for brevity>
  [Datablock 2: Speaker Allocation Data Block]
    <omitted for brevity>
  [Datablock 3: HDMI Vendor Specific Data Block]
    <omitted for brevity>
  [Datablock 4:ABC Co. Vendor specific Data Block]
  Version...: 2
  Features (Byte 1)...:
    Dynamic Frame Rate Supported ...: Yes
    Native Tone Mapping Support .: Yes
    Backlight Control Support ...: Native Mode
    Local Dimming Control ...: Yes
    Minimum Refresh Rate [Hz] ...: 40
    Maximum Refresh Rate [Hz] ...: 144
    MCCS VCP Code ...: 0
  EOTF Support (Byte 5) ...:
    sRGB EOTF Support ...: No
    BT709 support ...: No
    Gamma 2.2 Support ...: Yes
    Gamma 2.6 Support ...: No
  Max Luminance 1 ...: 100 (436.2031 nits)
  Min Luminance 1 ...: 50 (0.1677 nits)
  Max Luminance 2 ...: 20 (77.1105 nits)
  Min Luminance 2 ...: 40 (0.0190 nits)

With an EDID indicating the native gamut characteristics, native luminance ranges, and backlight parameters of the display monitor 204 or otherwise signaled as side band data during initialization, at block 406 the SDK/OS interface 308 accesses the data of the EDID or other sideband data to determine whether the display monitor 204 supports native tone mapping support from the corresponding bit field of the VSDB of the EDID. If native tone mapping is not enabled by the display monitor 204, at block 408 the SDK/OS interface 308 signals the tone mapping function 317 of the display driver 312 to configure the GPU 208 to render each display image of the video stream with default tone mapping in accordance with the conventional-mode display pipeline 100 described above.

Otherwise, if the bit field of the VSDB of the EDID indicates that the display monitor 204 supports native tone mapping, the SDK/OS interface 308 signals this capability to the display driver 312. In response, at block 410 the display driver 312 determines the native gamut and luminance range(s) of the display monitor 204 by accessing the chromaticity values from the EDID that represent the native color gamut of the display monitor (e.g., the X-Y values for the red, green, and blue chromaticities) and the luminance values and backlighting parameters from the EDID that represent the native luminance range(s) under various backlighting levels or modes (e.g., minimum to maximum luminance when backlight at maximum brightness, minimum to maximum luminance when backlight at minimum brightness, or maximum, minimum, and average luminance when local dimming enabled) and populates one or more tables or other data structures with representative values for later use.

With this initialization complete, at block 412 the video content application 304 manipulates the rendering device 202 to initiate generation of a video stream composed of a sequence of display images and corresponding metadata for transmission to, and display at, the display monitor 204. For each display image to be generated, at block 414 the video content application 304 determines the image content to be represented by the display image and provides a representation of such to the graphics driver 310 via the OS interface 306.

At block 416, the graphics driver 310, or alternatively, the display driver 312, determines whether the display image is to be rendered using the native tone mapping mode or the conventional default tone mapping mode. To illustrate, in some situations there may be multiple application windows open at the same time, with some application windows being native tone rendered and others being default tone rendered. In such cases, the final display image incorporating all of the different application windows may be rendered using the conventional default tone mapping mode. Likewise, when an operating system is composing different display content on top of the native color application (such as for displaying user interface (UI) controls on top of the native display content), the resulting composite display frame would likely be rendered according to the conventional default tone mapping mode.

If the display image is to be tone mapped to the default color space and luminance range of the display specification supported by the display monitor 204, then at block 418 the tone mapping function 317 of the display driver 312 configures the GPU 208 with the chromaticity values for the default color gamut and with a luminance EOTF representative of the default luminance range and at block 420 the GPU 208 executes the shader operations and other drawing operations on the basis of these default parameters so as to render the display image with tone mapping consistent with the default gamut and luminance range of the display specification. Tone mapping content within a specific luminance range typically involves taking the source display content and either compressing or clipping the content, or combination of compression and clipping. For example, display content is usually rendered to either an 8/10 bit ARGB surface or FP16 surface. In the case of an 8/10 bit ARGB surface, the display content typically is already encoded in sRGB gamma so the display content is already in a format that can be directly transmitted to the display monitor. As such, the display driver merely needs to signal the monitor that content is sRGB encoded.

In the case of FP16 surface, the display content is typically in linear space with each value having the meaning of a specific luminance. Specifically, an FP16 value of 1 translates to X nits, an FP16 value of 2 translates to Y nits, an FP16 value of 0.5 translates to Z nits, and so forth. This means it needs to be tone mapped and encoded in some default industry format that the display monitor could understand. One approach to this mapping and encoding is by clipping any display data that is outside of the target luminance range. For example, suppose the GPU is configured to output in 8 bit per color depth, in sRGB encoding, in SDR luminance range (which in this example assume extends up to X nits). An 8 bit value of 255 thus represents maximum SDR luminance of X nits. In one approach, the FP16 values can be encoded in the sRGB gamma curve and any FP16 values that are above a value of 1 are clipped. In effect, any display content that is above FP16 value of 1 would all look identical since they are clipped to X nits (8 bit output value of 255). An alternative approach is to retain some of the details in the display content that is above FP16 value of 1. The content may be scaled in such a way that all values are scaled down such that the maximum content value is now 1, and the resulting scaled content can be sRGB encoded.

Tone mapping to fit within a specific gamut typically operates under a representation of a color gamut defined by three X/Y coordinates that represent the greatest Red, Green, and Blue points that can be represented in the identified color space. If the display content is represented by a color gamut larger than that supported by the display monitor 204, a gamut remap is used to represent the display content in the smaller gamut. As with luminance tone mapping, the gamut remap typically involves scaling, clipping, or combination thereof. To illustrate, one common approach is to implement a gamut remap function by multiplying pixels with a 3×3 gamut remap matrix, whereby the input pixel RGB x/y coordinates are multiplied with the 3×3 matrix to produce the output pixel RGB x/y coordinate values. As will be appreciated, these approaches are somewhat unpredictable from the perspective of the content creator, and thus leaving the luminance clipping/mapping and color clipping/mapping to the display monitor can provide an unpredictable result that may be inconsistent with what was intended by the content creator.

Returning to block 416, if native tone mapping is active for the display image to be rendered, then at block 422 the tone mapping function 317 of the display driver 312 accesses the native gamut and luminance parameters stored at block 410 and configures the GPU 208 with these parameters. At block 424, the GPU 208 renders the display image in accordance with these configuration parameters so that the display image is tone mapped to the native color gamut and native luminance ranges represented by these parameters.

At block 426, the display driver 312 encodes the data of the display image generated through either the process of blocks 418 and 420 or blocks 422 and 424 in accordance with the appropriate coding/transport protocol, such DisplayPort or HDMI specifications, and provides the resulting data for transmission to the display monitor 204 via the display IF 212 and interconnect 203. In the example of method 400, if native tone mapping is enabled by the display monitor 204, then a given display image of the transmitted video stream may be either native tone-mapped or default tone-mapped, depending on one or more factors. Accordingly, to identify the tone mapping mode used to render the display image so that the display monitor 204 can process the received display image accordingly, at block 428 the display driver 312 provides metadata in association with the encoded display image so as to identify the tone mapping mode employed for the display image. The CEA-861 specification employed by at least some of the HDMI and DisplayPort specifications provides for the use of sideband InfoFrame packets are used to supply metadata for encoded display frames, or display images, on a per-frame basis. Accordingly, in at least one embodiment, the HDR InfoFrame function 318 of the display driver 312 identifies the tone mapping mode employed for rendering the display image and generates an InfoFrame packet for transmission along with the encoded display image, with the InfoFrame packet including an identifier of the tone mapping mode. For example, Table 4 below illustrates an example format for an InfoFrame packet with a bit field PB6-bit 3 that identifies whether the native tone mapping mode was used for the display image:

TABLE 4

| Example InfoFrame packet with tone mapping mode indicator | | | | | | | | |
|---|---|---|---|---|---|---|---|---|
| Byte\Bit# | 7 | 6 | 5 | 4 | 3 | 2 | 1 | 0 |
| HB0 | VENDOR SPECIFIC INFO FRAME (VSIF) Packet Header | | | | | | | |
| HB1 | Version = 0x0X | | | | | | | |
| HB2 | 0 | 0 | 0 | | <omitted for clarity> | | | |
| Packet Byte # | 7 | 6 | 5 | 4 | 3 | 2 | 1 | 0 |
| PB0 | | | | | <omitted for clarity> | | | |
| PB1 | | | | | <Omitted for clarity> | | | |
| PB2 | | | | | | | | |
| PB3 | | | | | | | | |
| PB4 | | | | | <omitted for clarity> | | | |
| PB5 | | | | | | | | |
| PB6 | | <omitted for clarity> | Bit 5 = Local Dimming Disable | Bit 4 = Brightness Control Active (PB 10) | Bit 3 = Native Tone Mapping Active (PB 9) | <omitted for clarity> | <omitted for clarity> | <omitted for clarity> |
| PB7 | | | | | <omitted for clarity> | | | |
| PB8 | | | | | <omitted for clarity> | | | |
| PB9 | | <omitted for clarity> | | | Bit 3 = Gamma 2.6 EOTF Active | Bit 2 = Gamma 2.2 EOTF Active | Bit 1 = BT709 EOTF Active | Bit 0 = sRGB EOTF Active |
| PB10 | | | | | Brightness Control (%) | | | |
| PB11-PB27 | | | | | <omitted for clarity> | | | |

As transmission of the display image rendering during the current iteration of method 400 is initiated, the method 400 may return for the next iteration to block 414 for the next display image to be included in the output video stream.

Turning now to FIG. 5, an example video stream display method 500 of the display monitor 204 is illustrated in accordance with some embodiments. An iteration of method 500 is performed for each encoded display image received in the video stream output from the rendering device 202. Accordingly, at block 502, the display interface 214 receives data representative of a display image from the rendering device 202 via the interconnect 203 and the display interface 214. Concurrently, at block 504 the display interface 214 received the InfoFrame packet or other per-image metadata associated with that particular display image.

At block 506, the display controller 216 uses the tone mapping field of the InfoFrame packet to determine whether the display image was rendered with native tone mapping or with conventional default tone mapping. To illustrate, if the InfoFrame packet format of Table 4 above is used, a value of "0" at PB6-bit 3 indicates conventional default tone mapping was used, whereas a value of "1" indicates native tone mapping was used. If the InfoFrame packet or other image metadata indicates that native tone mapping was used for the individual display image associated with that InfoFrame packet, then the display controller 216 identifies the display image as having a color gamut and luminance range already compatible with the capabilities of the display matrix 218. Accordingly, at block 508 the display controller 216 is configured to override any user-specified on-screen display (OSD) settings that may interfere with the native color gamut and luminance range(s) of the display image and at block 510 the display controller 216 provides or otherwise readies the display image for display at the display matrix 218 without requiring any further tone mapping to re-map the display image from another color space and luminance range to the color space and luminance range actually supported by the display monitor 204.

Returning to block 506, if the display controller 216 instead determines that the display image was encoded according to the conventional default color gamut and luminance range, then at block 512 the display controller 216 accesses any user-defined OSD settings related to the color space or luminance settings, such as brightness, hue, saturation, etc. Further, some display monitor implementations even allow the user through OSD settings to override the EOTF implemented by the display monitor. To illustrate, such a display monitor may ignore an indication from the display driver that video output from the rendering device is in, for example, an sRGB format and instead interpret the display data as being in a Gamma 2.6 EOTF. Hence, the ability of the display monitor 204 to signal such EOTF overrides as display parameters further supports accurate native tone mapping by the rendering device.

At block 514 the display controller 216 performs post-processing on the display image to tone map the display image to the native color space and native luminance ranges using an Electro-Optical Transfer Function, Perceptive Quantizer (PQ) curve, or gamma curve that represents the mapping to the gamut and luminance range of the display monitor 204. This post-processing further may be based on the user-defined OSD settings determined at block 512, such as by implementing various brightness, hue, and saturation settings through multiplying the pixel data by a corresponding color adjustment matrix or by modifying the applied EOTF. At block 516, the display controller 216 provides the resulting tone re-mapped display image for display at the display matrix 218.

In some embodiments, the apparatus and techniques described above are implemented in a system comprising one or more integrated circuit (IC) devices (also referred to as integrated circuit packages or microchips), such as the rendering device and display monitor described above with reference to FIGS. 1-5. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   obtaining, at a rendering device, display parameters for a display monitor coupled to the rendering device, the display parameters including data identifying a native color gamut, a native luminance range of the display monitor, and one or more backlighting characteristics of the display monitor;
   rendering, at a graphics processing unit (GPU) of the rendering device, a first display image that is tone mapped to the native color gamut and the native luminance range and based on the one or more backlighting characteristics;
   providing the first display image for receipt by the display monitor as part of a video stream;
   rendering, at the GPU, a second display image that is tone mapped to a default color gamut and a default luminance range associated with a display specification supported by the display monitor; and
   providing the second display image for receipt for the display monitor as part of the video stream.

2. The method of claim 1, further comprising:
   receiving, at the display monitor, the first display image; and
   providing the first display image for display at the display monitor without tone re-mapping the first display image.

3. The method of claim 1, further comprising:
   receiving, at the display monitor, the first display image;
   providing the first display image for display at the display monitor without tone re-mapping the first display image;
   receiving, at the display monitor, the second display image;
   tone re-mapping the second display image from the default color gamut to the native color gamut and from the default luminance range to the native luminance range to generate a tone-remapped display image; and
   providing the tone re-mapped display image for display at the display monitor.

4. The method of claim 3, further comprising:
   providing a first metadata associated with the first display image from the rendering device to the display monitor, the first metadata identifying the first display image as tone mapped to the native color gamut and native luminance range; and
   providing a second metadata associated with the second display image from the rendering device to the display monitor, the second metadata identifying the second display image as tone mapped to the default color gamut and default luminance range.

5. The method of claim 4, wherein:
   providing the first display image for display at the display monitor without tone re-mapping is responsive to receiving the first metadata at the display monitor; and
   tone re-mapping the second display image is responsive to receiving the second metadata at the display monitor.

6. The method of claim 1, wherein the one or more backlighting characteristics include at least one of:
   support by the display monitor of source-controlled global backlighting; and
   support by the display monitor of source-controlled local dimming.

7. The method of claim 1, wherein the one or more backlighting characteristics include at least one of:
   a maximum panel brightness at a maximum backlight level;
   a minimum panel brightness at a maximum backlight level;
   a maximum panel brightness at a minimum backlight level;
   a minimum panel brightness at a minimum backlight level;
   a peak panel brightness with local dimming enabled; and
   an average panel brightness with local dimming enabled.

8. The method of claim 1, wherein obtaining the display parameters comprises:
   providing an Extended Display Identification Data (EDID) from the display monitor to the rendering device, the EDID including chromaticity values representative of the native color gamut and one or more values representative of the native luminance range.

9. A display system comprising:
   a rendering device configured to couple to a display monitor, the rendering device comprising:
   a graphics processing unit (GPU) configured to render display images for a video stream to be displayed at the display monitor; and
   a central processing unit (CPU) configured to:
      obtain display parameters for the display monitor, the display parameters including data identifying a native color gamut, a native luminance range of the display monitor, and at least one backlighting characteristic of the display monitor;
      configure the GPU to render a first display image of the video stream that is tone mapped to the native color gamut and the native luminance range and based on the at least one backlighting characteristic; and
      configure the GPU to render a second display image for the video stream that is tone mapped to a default color gamut and a default luminance range associated with a display specification supported by the display monitor.

10. The display system of claim 9, further comprising:
the display monitor, wherein the display monitor is configured to:
receive the first display image; and
provide the first display image for display at the display monitor without tone re-mapping the first display image.

11. The display system of claim 9, further comprising:
the display monitor, wherein the display monitor is configured to:
receive the first display image;
provide the first display image for display without tone re-mapping the first display image;
receive the second display image;
tone re-map the second display image from the default color gamut to the native color gamut and from the default luminance range to the native luminance range to generate a tone-remapped display image; and
provide the tone re-mapped display image for display.

12. The display system of claim 11, wherein the rendering device is further configured to:
provide a first metadata associated with the first display image to the display monitor, the first metadata identifying the first display image as tone mapped to the native color gamut and native luminance range; and
provide a second metadata associated with the second display image to the display monitor, the second metadata identifying the second display image as tone mapped to the default color gamut and default luminance range.

13. The display system of claim 12, wherein the display monitor is further configured to:
provide the first display image for display without tone re-mapping responsive to receiving the first metadata; and
tone re-map the second display image responsive to receiving the second metadata.

14. The display system of claim 9, wherein the CPU is configured to obtain the display parameters by accessing an Extended Display Identification Data (EDID) providing the display monitor to the rendering device, the EDID including chromaticity values representative of the native color gamut and one or more values representative of the native luminance range.

15. A method comprising:
receiving, at a display monitor, a display image of a video stream from a rendering device;
receiving, at the display monitor, metadata associated with the display image, the metadata indicating whether the display image is tone mapped to a native color gamut, native luminance range of the display monitor and based on one or more backlighting characteristics of the display monitor or tone mapped to a default color gamut and default luminance range of a display specification supported by the display monitor;
responsive to the metadata identifying the display image as being tone mapped to the native color gamut, native luminance range and based on one or more backlighting characteristics of the display monitor, providing the display image for display at the display monitor without tone re-mapping the display image; and
responsive to the metadata identifying the display image as being tone mapped to the default color gamut and default luminance range:
tone re-mapping the display image from the default color gamut to the native color gamut and from the default luminance range to the native luminance range to generate a tone-remapped display image; and
providing the tone re-mapped display image for display at the display monitor.

16. The method of claim 15, further comprising:
providing display parameters from the display monitor to the rendering device during an initialization process, the display parameters including a representation of the native color gamut and the native luminance range of the display monitor.

17. The method of claim 15, wherein the one or more backlighting characteristics include at least one of:
support by the display monitor of source-controlled global backlighting; and
support by the display monitor of source-controlled local dimming.

18. The method of claim 15, wherein the one or more backlighting characteristics include at least one of:
a maximum panel brightness at a maximum backlight level;
a minimum panel brightness at a maximum backlight level;
a maximum panel brightness at a minimum backlight level;
a minimum panel brightness at a minimum backlight level;
a peak panel brightness with local dimming enabled; and
an average panel brightness with local dimming enabled.

* * * * *